United States Patent
Kuo

(10) Patent No.: US 6,874,601 B2
(45) Date of Patent: Apr. 5, 2005

(54) BRAKE PAD ASSEMBLY

(76) Inventor: Yung-Pin Kuo, No. 55, Alley 121, Lane 175, Kuo Shen Rd., Chang Hwa City (TW)

( * ) Notice: Subject to any disclaimer, the term of this patent is extended or adjusted under 35 U.S.C. 154(b) by 0 days.

(21) Appl. No.: 10/374,976

(22) Filed: Feb. 28, 2003

(65) Prior Publication Data
US 2004/0168869 A1 Sep. 2, 2004

(51) Int. Cl.⁷ .............................. B62L 3/00; F16D 1/00
(52) U.S. Cl. ................ 188/24.22; 188/245; 188/250 G; 403/348; 403/361
(58) Field of Search ............................ 188/24.22, 24.12, 188/72.7, 73.1, 245, 246, 250 B, 250 G, 250 D; 403/348, 354, 360, 361, 365, 366

(56) References Cited

U.S. PATENT DOCUMENTS

| | | | | | |
|---|---|---|---|---|---|
| 4,051,924 A | * | 10/1977 | Yoshigai | ................. | 188/24.12 |
| 4,444,294 A | * | 4/1984 | Yoshigai | ................. | 188/24.11 |
| 4,546,858 A | * | 10/1985 | Nagano | ................. | 188/24.19 |
| 6,125,973 A | * | 10/2000 | Irvine | ................. | 188/24.22 |
| 6,386,328 B1 | * | 5/2002 | Chen | ................. | 188/24.11 |

* cited by examiner

*Primary Examiner*—Xuan Lan Nguyen
(74) *Attorney, Agent, or Firm*—Rosenberg, Klein & Lee

(57) ABSTRACT

A brake pad assembly includes a shank with a brake pad connected to a first end thereof and the shank extends through a support frame, a first positioning member, a brake arm, a second positioning member, a holding member and is threadedly connected to a nut. The first positioning member and the second positioning member are located on two opposite sides of the brake arm and each of which has two lugs which are retained in a hole of the brake arm. By the lugs, the two positioning members can only be rotated at a limited angle in the hole of the brake arm.

6 Claims, 6 Drawing Sheets

BRAKE PAD ASSEMBLY

FIELD OF THE INVENTION

The present invention relates to a brake pad assembly that includes two positioning members to secure the shank of the brake frame.

BACKGROUND OF THE INVENTION

A conventional bicycle brake pad assembly 10 is shown in FIG. 1 and generally includes a frame which includes a shank 111 and the brake pad 11 is connected to a first end of the shank 111 and a second end of the shank 111 extends through two pairs of positioning members 13 and holding members 14 and a washer 15 and is connected with a nut 16. The whole brake pad assembly 10 is connected to a brake arm 20 which is clamped between the two pairs of the positioning members 13 and the holding members 14. In order to allow the different brands of brake pad assemblies 10 to be connected to the brake arm 20, the center hole 21 of the brake arm 20 is made to be larger than the shank 111. Nevertheless, as shown in FIG. 2, when threading the nut 16, because the two positioning members 13 contact the brake arm 20 by a plane surface which cannot effectively positioning the brake arm 20. Furthermore, the shank 111 could tilt within the center hole 21 so that the assembler has to pull the brake pad 11 by hand after the nut 16 is connected to the second end of the shank 111.

The present invention intends to provide a brake pad assembly that includes two positioning members which are securely engaged with the center hole of the brake arm.

SUMMARY OF THE INVENTION

In accordance with one aspect of the present invention, there is provided a brake pad assembly which comprises a shank with a brake pad connected to a first end thereof and the brake pad is engaged with a support frame. A first positioning member has a first side thereof connected to the support frame and two first lugs extend from a second side of the first positioning member. The shank extends through the first positioning member. A second positioning member has a first side thereof connected to a holding member and two second lugs extend from a second side of the second positioning member. The first and the second lugs are retained in a hole of a brake arm located between the first positioning member and the second positioning member. The shank extends through the second positioning member and a nut is threadedly connected to a second end of the shank.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

Figure 1:
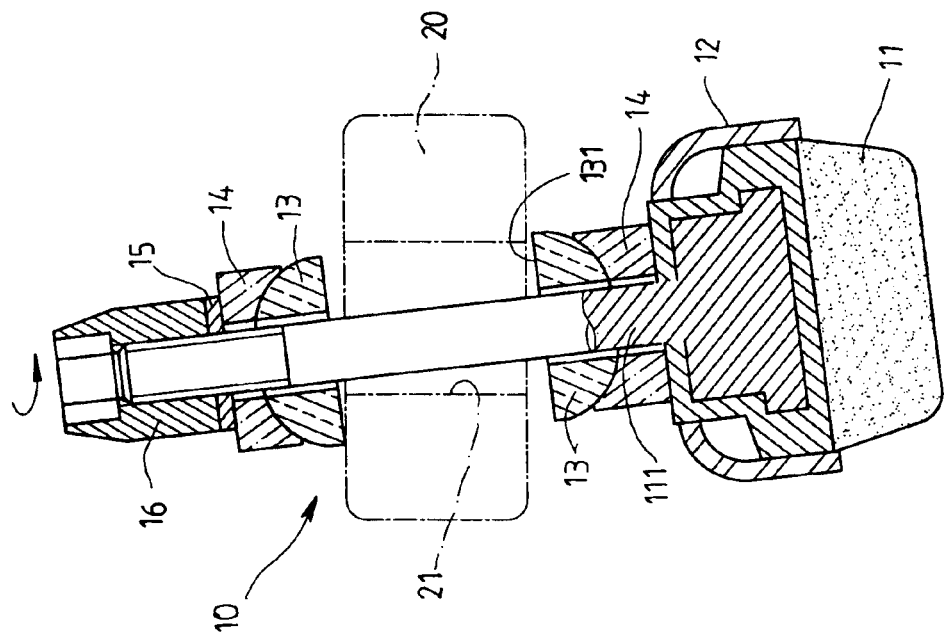
FIG. 1 is a cross sectional view to show a conventional brake pad assembly.
Figure 2:
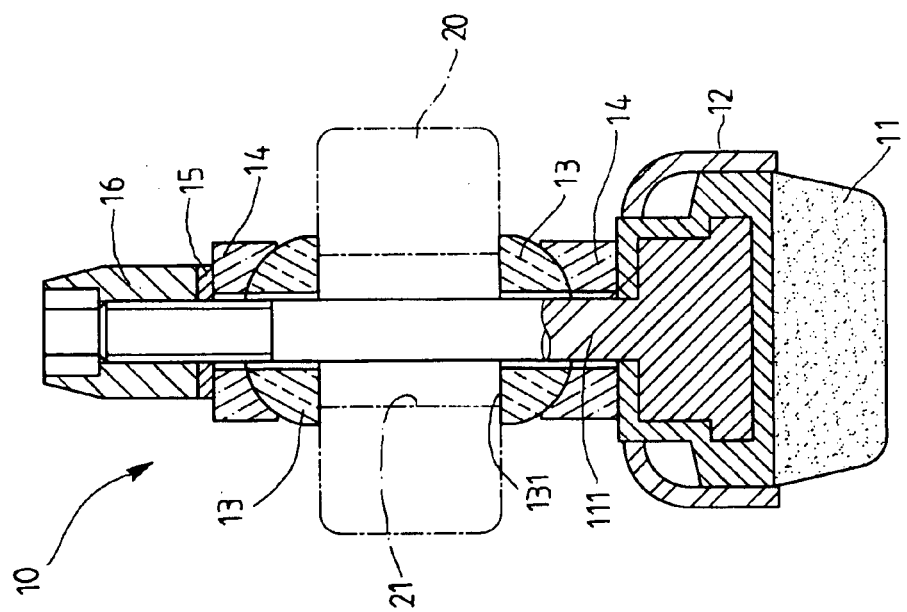
FIG. 2 is a cross sectional view to show that the shank is tilt in the center hole of the brake arm.
Figure 3:
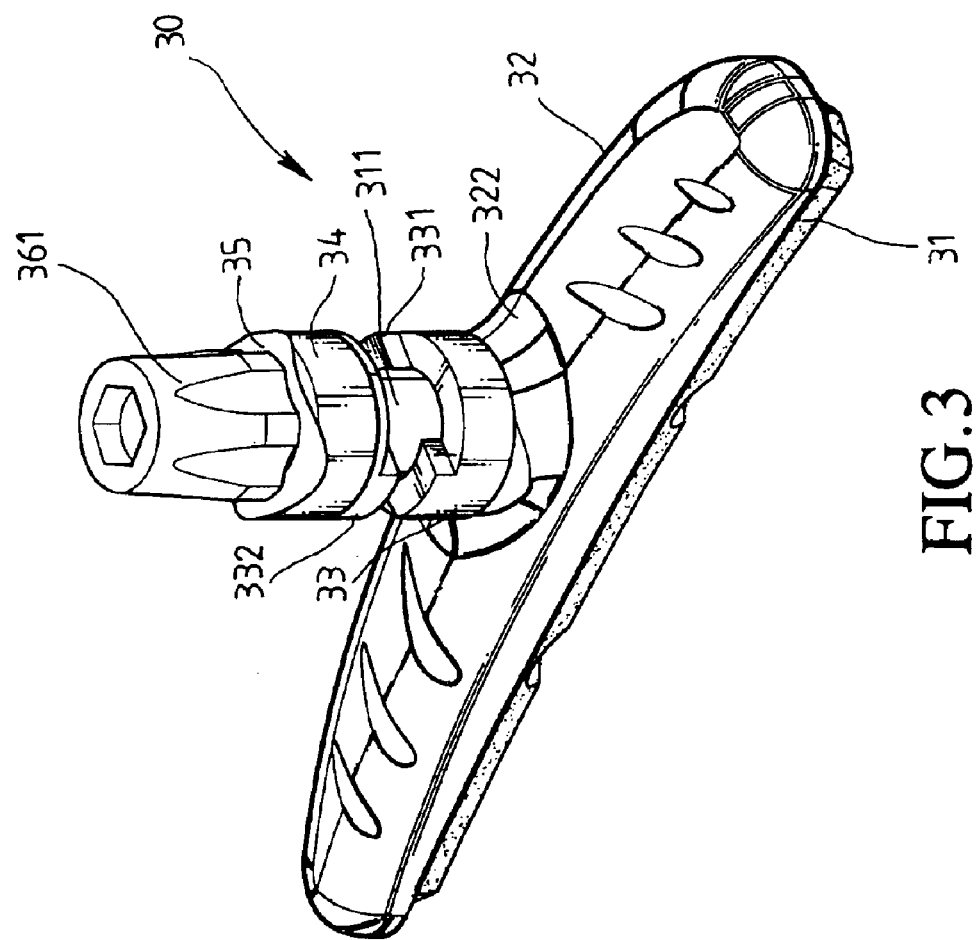
FIG. 3 is a perspective view to show the brake pad assembly of the present invention.
Figure 4:
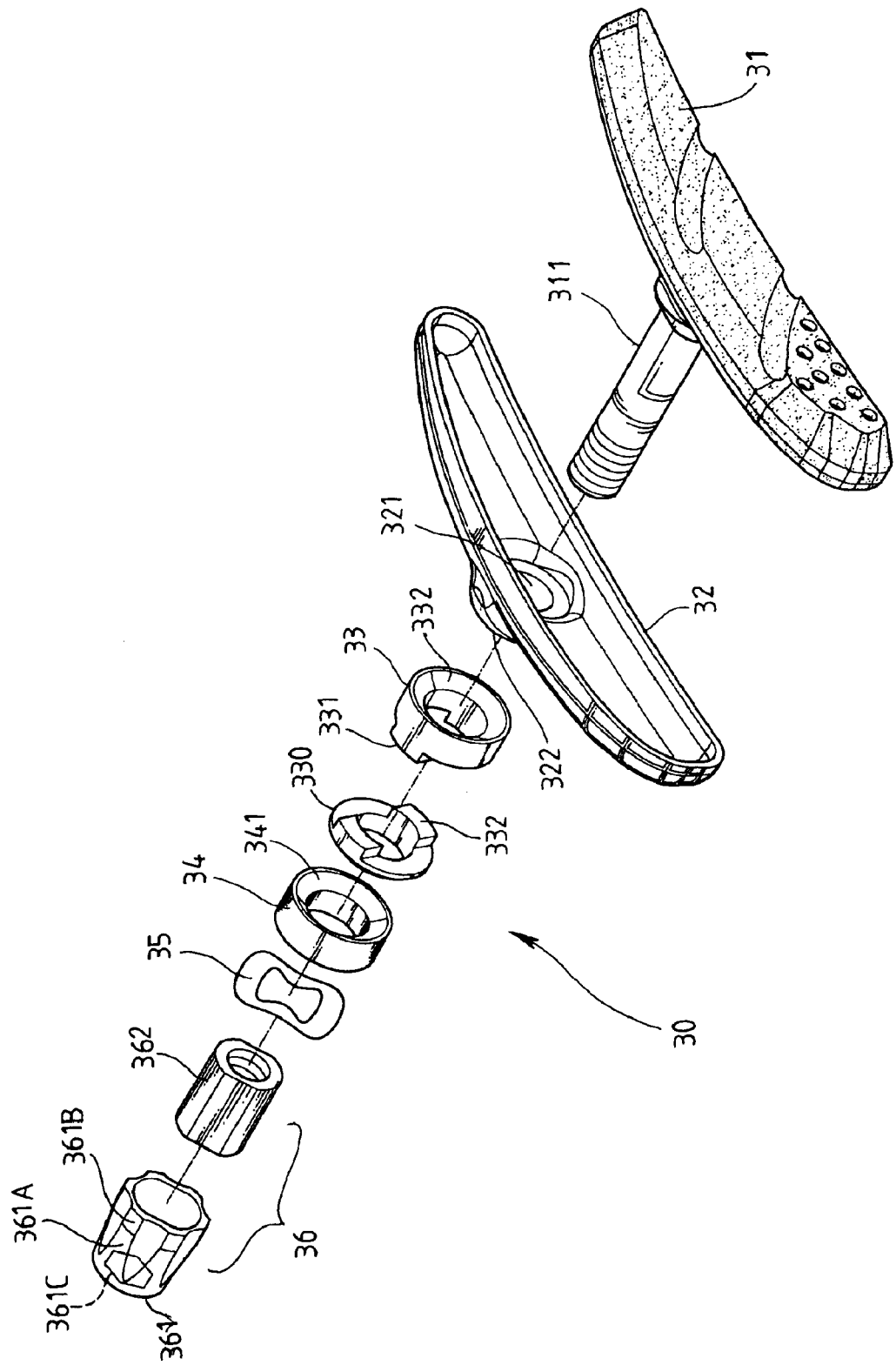
FIG. 4 is an exploded view to show the brake pad assembly of the present invention.
Figure 5:
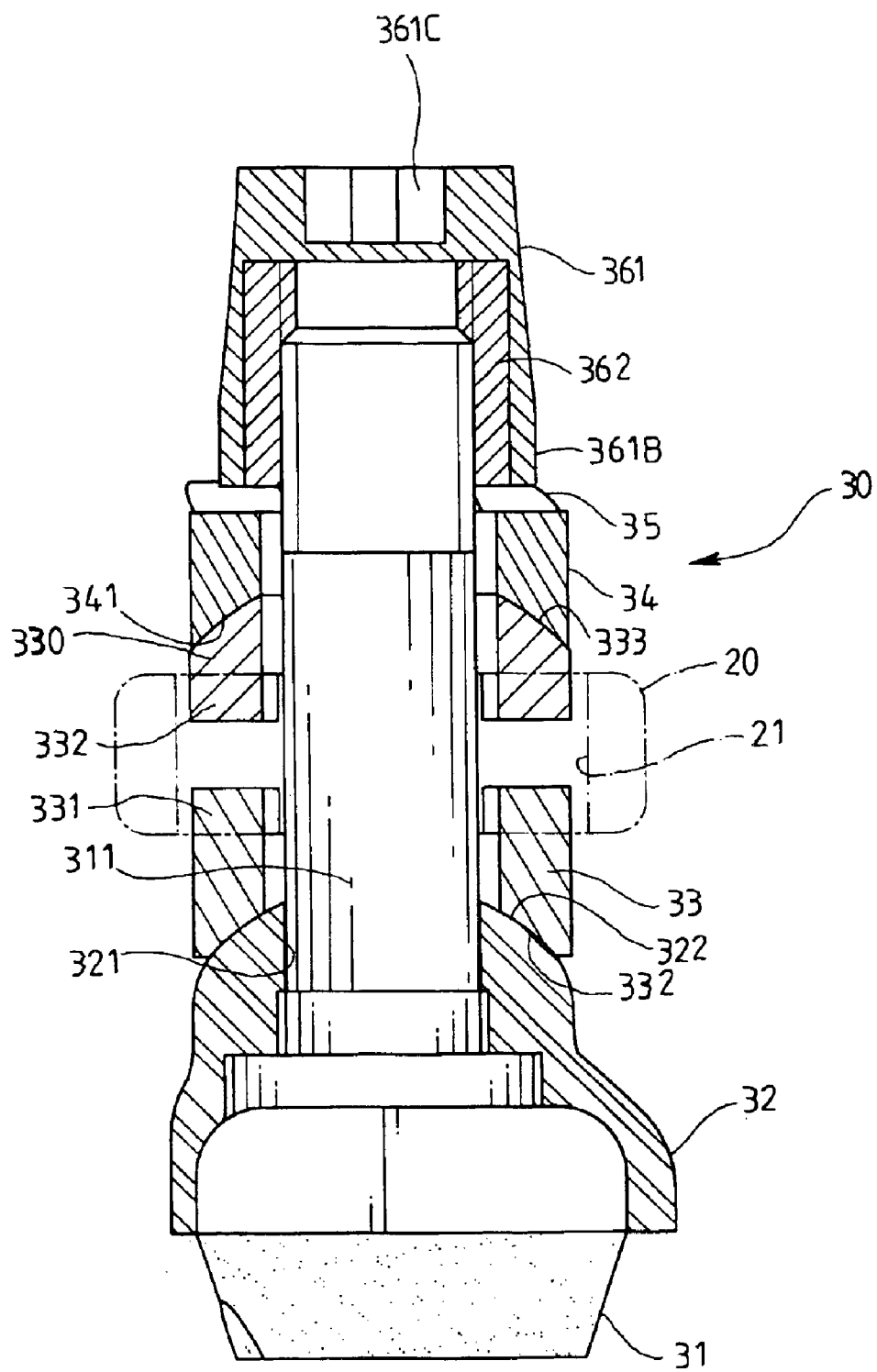
FIG. 5 is a cross sectional view to show the brake pad assembly of the present invention connected to a brake arm.
Figure 6:
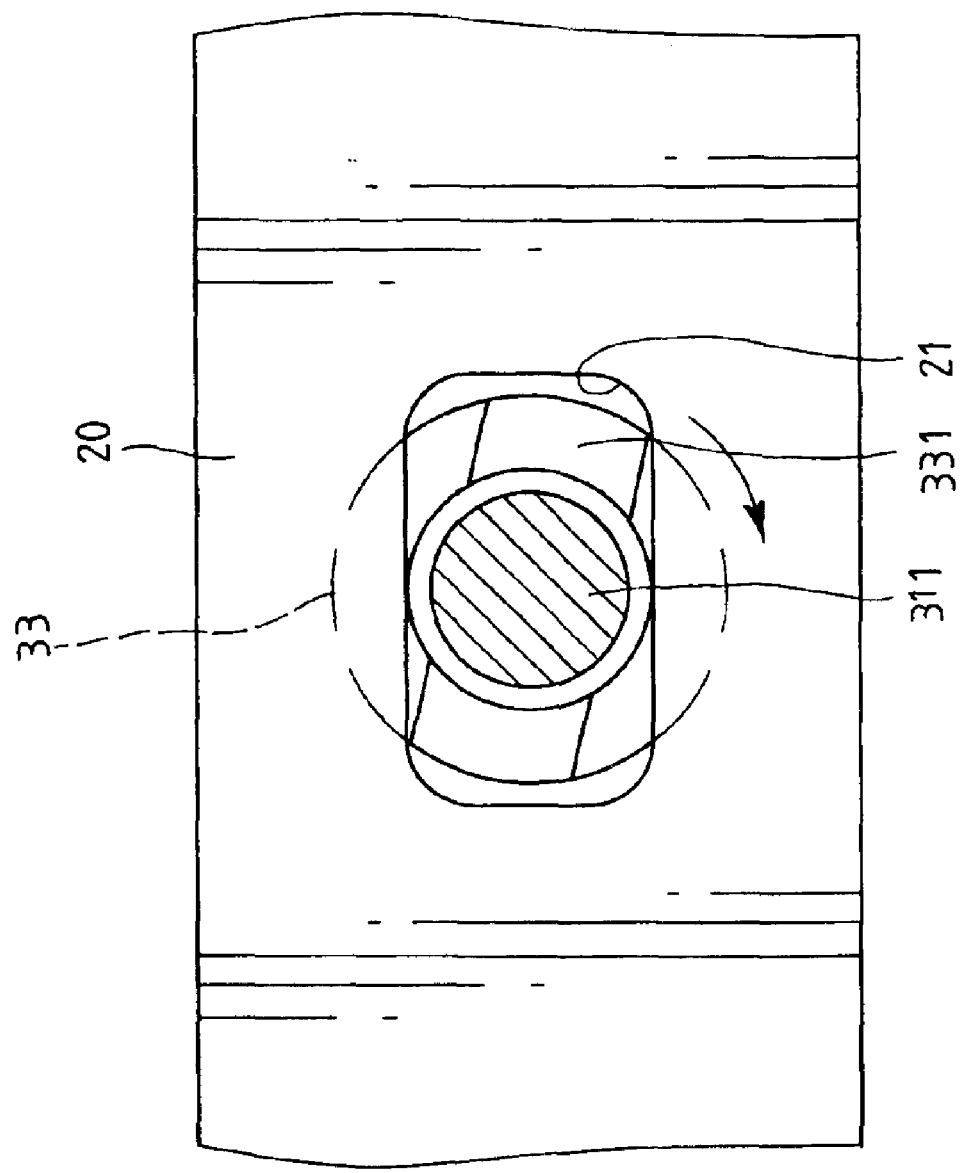
FIG. 6 shows the lugs of the two positioning members are retained in the hole of the brake member.
Figure 7:
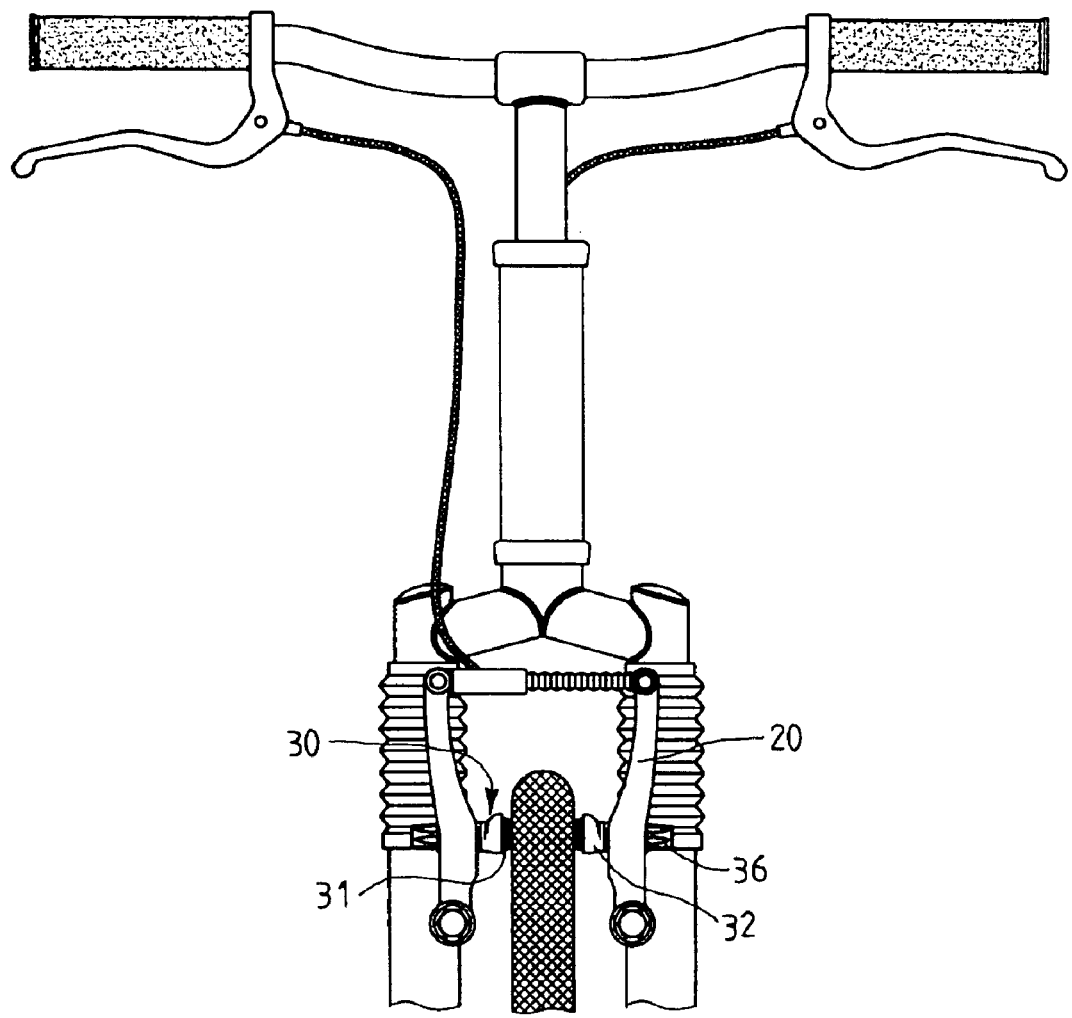
FIG. 7 shows two brake pad assembly are connected to two brake arms of a bicycle.

Referring to FIGS. 3, 4, 5 and 7, the brake pad assembly 30 of the present invention comprises a shank 311 with a brake pad 31 connected to a first end thereof and the brake pad 31 is engaged with a support frame 32. The shank 311 extends through a hole 321 defined through the support frame 32. A protrusion 322 that has an arcuate surface extends from a side opposite to the brake pad 31 of the support frame 32.

A first positioning member 33 has a first arcuate recess 332 defined in a first side thereof and two first lugs 331 extend from a second side of the first positioning member 33, first arcuate recess 332 of the first positioning member 33 is engaged with the protrusion 322. The first lugs 331 are retained in a hole 21 of a brake arm 20 and the shank 311 extends through the first positioning member 33.

A second positioning member 330 has an arcuate convex portion 333 extending from a first side thereof and two second lugs 332 extend from a second side of the second positioning member 330. The second lugs 332 are retained in the hole 21 of the brake arm 20 which is located between the first positioning member 33 and the second positioning member 330. The shank 311 extends through the second positioning member 330. The arcuate convex portion 333 is engaged with a second arcuate recess 341 defined in a holding member 34. A second end of the shank 311 further extends through the holding member 34 and a wave-shaped washer 35 and is threadedly connected to a nut 36.

It is to be noted that the hole 21 of the brake arm 20 can be an elongate hole so that the two first lugs 331 and second lugs 332 can only be rotated a limited angle in the hole 21, and this effectively positions the brake arm 20.

The nut 36 includes an inner part 362 and an outer part 361, wherein the inner part 362 has a polygonal outer surface and the outer part 361 having a polygonal inner surface which is matched with the polygonal outer surface of the inner part 362. The outer part 361 has ridges 361A extending longitudinally from an outer surface thereof so that the assemblers can conveniently rotate the nut 36 by hands. Each of the ridges 361A includes a plane surface 361B so that a wrench may clamp the outer part 361. Furthermore, the outer part 361 includes a polygonal hole 361C defined in an end thereof and a hex wrench can be used to rotate the nut 36.

While we have shown and described the embodiment in accordance with the present invention, it should be clear to those skilled in the art that further embodiments may be made without departing from the scope of the present invention.

What is claimed is:

1. A brake pad assembly comprising:
    a shank with a brake pad connected to a first end thereof and the brake pad engaged with a support frame, the shank extending through a hole defined through the support frame;
    a first positioning member having a first side thereof connected to the support frame and two first lugs extending from a second side of the first positioning member, the first lugs adapted to be retained in a hole of a brake arm, the shank extending through the first positioning member;

a second positioning member having a first side thereof connected to a holding member and two second lugs extending from a second side of the second positioning member, the second lugs adapted to be retained in the hole of the brake arm located between the first positioning member and the second positioning member, the shank extending through the second positioning member, and a nut threadedly connected to a second end of the shank, said nut having an inner part and an outer part, the inner part having a polygonal outer surface and the outer part having a polygonal inner surface which is matched with the polygonal outer surface of the inner part.

2. The assembly as claimed in claim 1, wherein the support frame includes a protrusion that has an arcuate surface and the first side of the first positioning member has a first arcuate recess which receives the protrusion.

3. The assembly as claimed in claim 1, wherein the first side of the second positioning member has an arcuate convex portion and the holding member has a second arcuate recess which receives the arcuate convex portion.

4. The assembly as claimed in claim 1, wherein the outer part has ridges extending longitudinally from an outer surface thereof.

5. The assembly as claimed in claim 4, wherein each of the ridges includes a plane surface.

6. The assembly as claimed in claim 1, wherein the outer part includes a polygonal hole defined in an end thereof.

* * * * *